United States Patent

Bornhorst, Jr.

[11] Patent Number: 5,819,658
[45] Date of Patent: Oct. 13, 1998

[54] ENGRAVER HAVING UNIVERSAL CYLINDER MOUNT

[75] Inventor: Kenneth F. Bornhorst, Jr., Centerville, Ohio

[73] Assignee: Ohio Electronic Engravers, Inc., Dayton, Ohio

[21] Appl. No.: 739,804

[22] Filed: Oct. 30, 1996

[51] Int. Cl.⁶ .................................................. B41F 1/28
[52] U.S. Cl. ........................................ 101/407.1; 101/212
[58] Field of Search ................. 101/407.1, 212; 242/596.7

[56] References Cited

U.S. PATENT DOCUMENTS

| | | | |
|---|---|---|---|
| 1,252,274 | 1/1918 | Lingo | 82/168 |
| 1,782,272 | 11/1930 | Power | 82/150 |
| 1,861,646 | 6/1932 | Stone | 242/596.7 |
| 1,967,004 | 7/1934 | Braden | 82/33 |
| 2,514,970 | 7/1950 | Prickett | 242/68 |
| 2,662,698 | 12/1953 | Littell | 242/596.1 |
| 3,050,786 | 8/1962 | John et al. | 101/375 |
| 3,057,238 | 10/1962 | Benes | 82/33 |
| 3,177,742 | 4/1965 | Basso | 82/1 |
| 3,756,102 | 9/1973 | Casey | 82/40 |
| 4,092,885 | 6/1978 | Kohori | 82/33 |
| 4,809,922 | 3/1989 | Fissmann et al. | 242/596.7 |
| 4,905,923 | 3/1990 | Dudley | 242/596.7 |
| 5,366,175 | 11/1994 | Schutz | 242/596.7 |
| 5,424,846 | 6/1995 | Bornhorst et al. | 358/299 |
| 5,493,939 | 2/1996 | Bornhorst, Jr. | 82/150 |
| 5,556,054 | 9/1996 | Neveu et al. | 242/596.7 |

OTHER PUBLICATIONS

"Martin Galvanotechnik Galvanoplastie Plating", R. G. Martin AG, CH–4106 Therwil, Erlenstrasse 50, Switzerland, undated brochure.

*Primary Examiner*—Edgar S. Burr
*Assistant Examiner*—Anthony H. Nguyen
*Attorney, Agent, or Firm*—Jacox, Meckstroth & Jenkins

[57] ABSTRACT

A universal cylinder mount for mounting at least one a plurality of cylinders between a headstock and a tailstock of an engraver. Each of the cylinders has a mounting aperture at each end adapted to receive a universal cylinder mount associated with each of the headstock and tailstock. The universal cylinder mount is adapted to accommodate a plurality of mounting apertures formed with different sized and having various sloped walls for facilitating alignment and frictional gripping engagement of the cylinders. The universal cylinder mount comprises at least one helically-shaped spiral or engaging edge to facilitate reducing or completely eliminating the seizing action between the cylinder aperture and the universal cylinder mount of the cylinder when the mounts are rotated in a non-engraving direction or are moved away from the mounting surfaces.

74 Claims, 10 Drawing Sheets

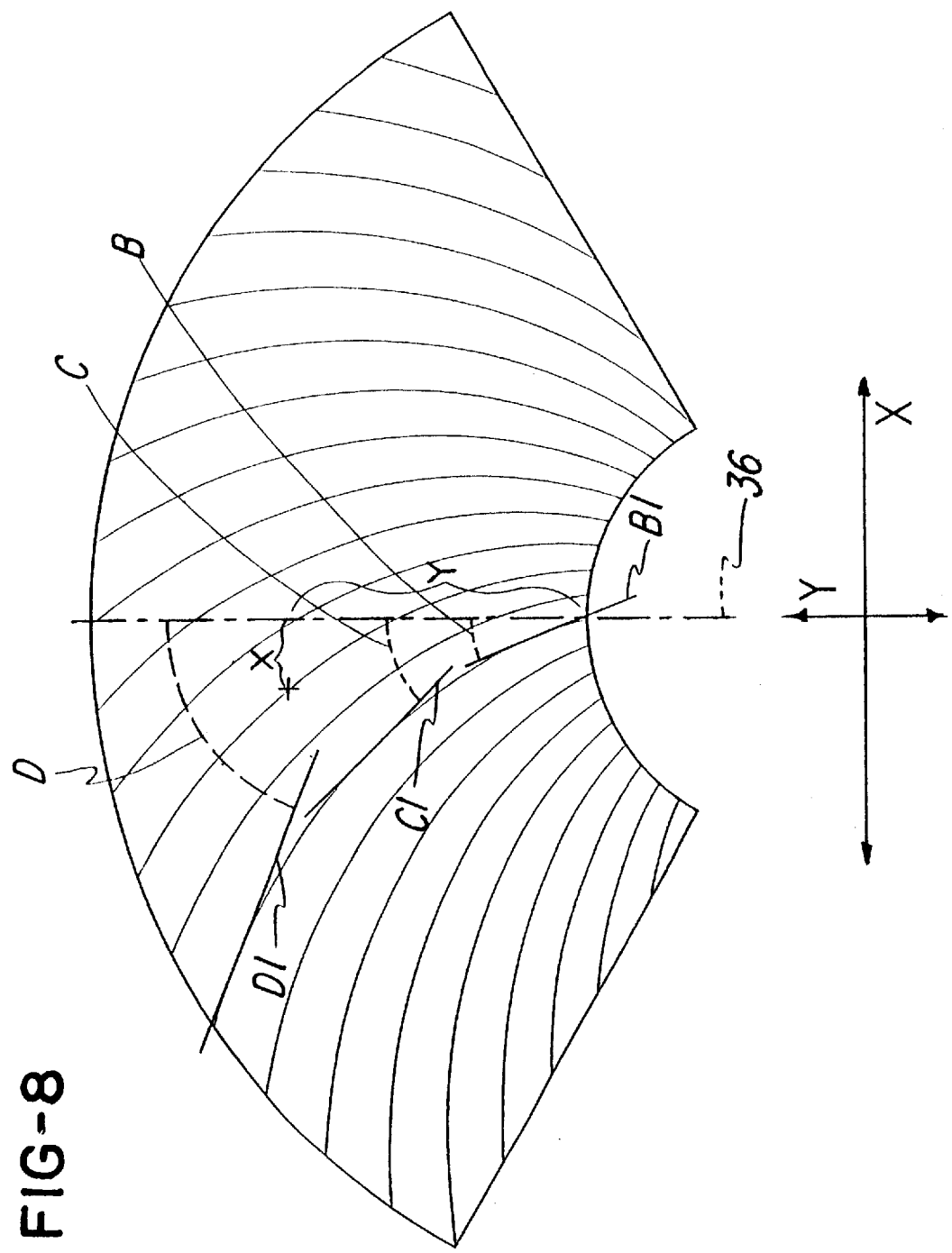

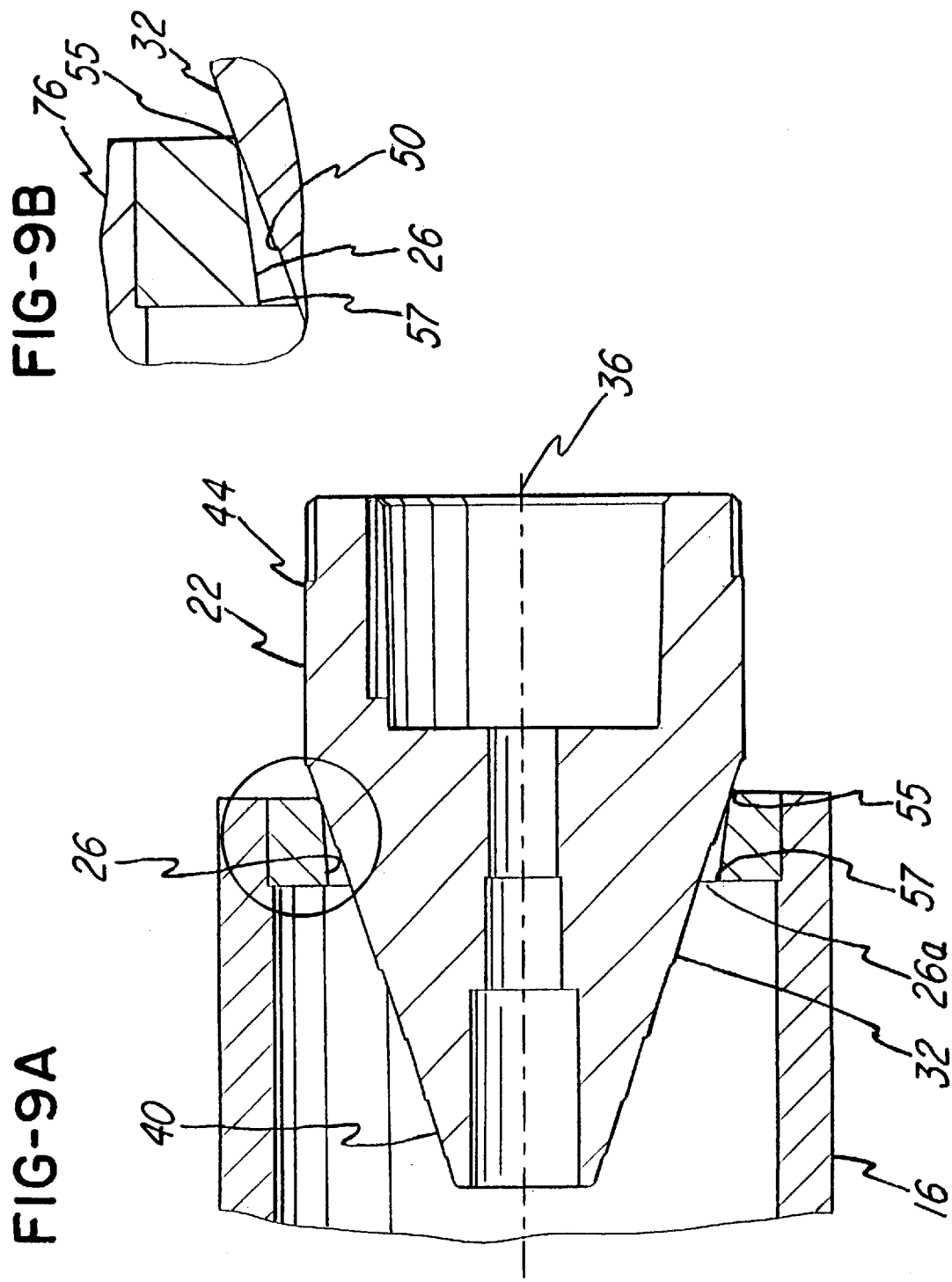

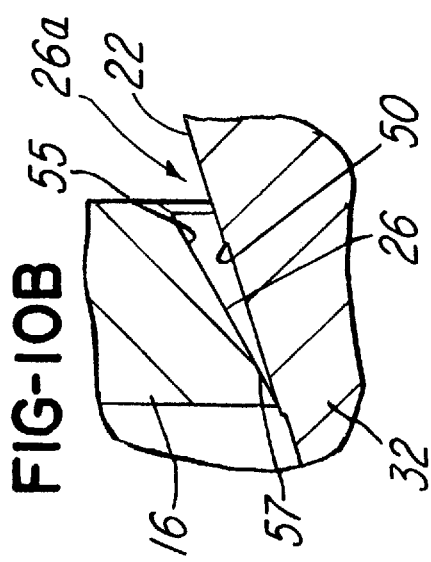
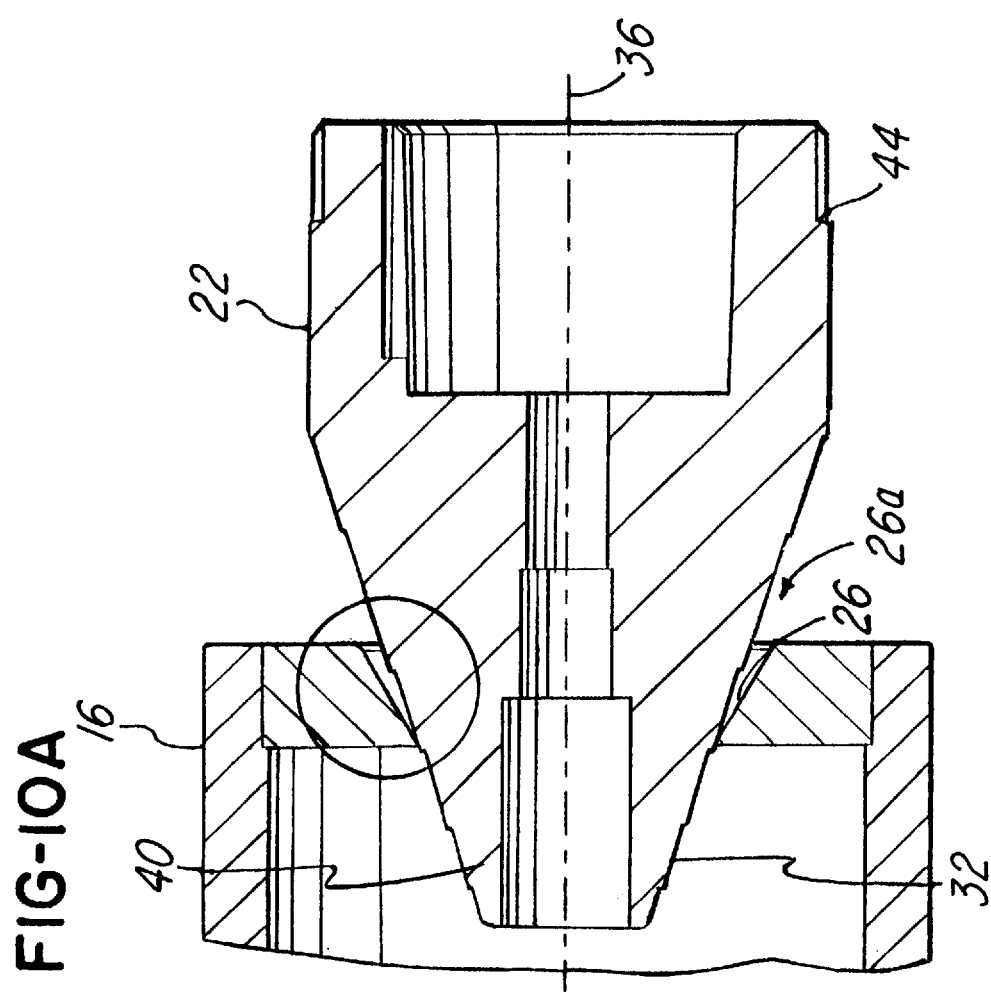

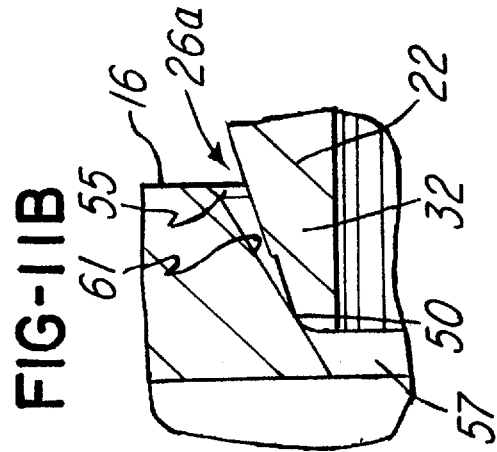
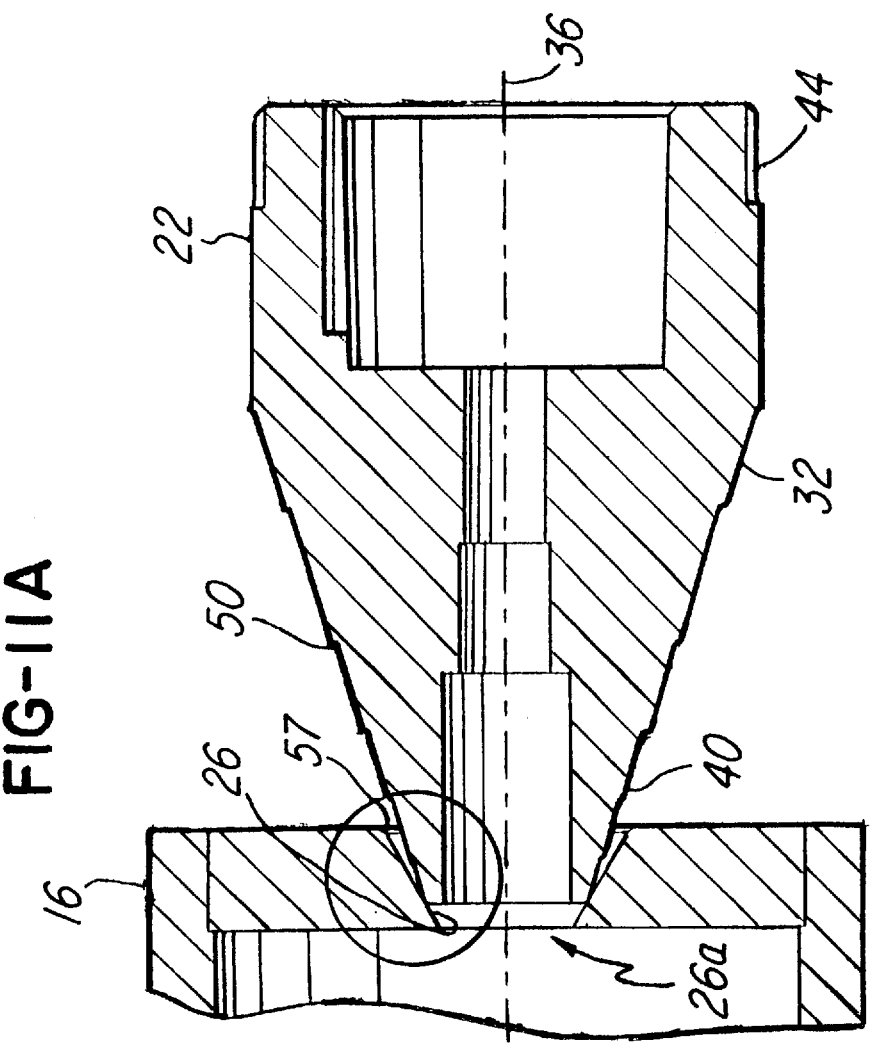

ENGRAVER HAVING UNIVERSAL CYLINDER MOUNT

BACKGROUND OF THE INVENTION

1. Field of the Invention

This invention relates to engravers, and more particularly, to engravers having universal cylinder mounts having lands defining substantially partial or full helix-shaped engraving surfaces for facilitating mounting and dismounting cylinders on the engraver.

2. Description of the Related Art

The engraving of a gravure cylinder involves rotating the cylinder about its axis while actuating an electronically controlled cutting tool or stylus which cuts or engraves cells into the surface of the cylinder. Alternatively, a laser source may be used to engrave the cells.

The engraved cylinder is generally used in a gravure printing press for printing paper, plastic or other material. The engraved cylinder can be used to print newspapers, magazines, cloth and packaging materials for various products. It may also be used for printing of patterns on wall paneling and floor coverings and the like.

The process of gravure printing is performed by applying ink to the surface of the engraved cylinder. Then the excess ink is wiped off the surface with a blade, so that only the engraved cells on the surface of cylinder contain ink. The ink is then transferred to the material being printed.

In order to obtain a high-quality print it is necessary that the cells or lines be very accurately engraved on the outer surface of the cylinder. These cells are usually placed within one or two microns from each other. The depth of the engraved cells must also be accurately controlled in order to control the amount of ink transferred from the cylinder onto the printing material. The amount of ink transferred to the printing material determines the shade of the print, for example, the shade of gray used in black and white printing.

In order to accurately engrave a cylinder, the cylinder had to be accurately positioned and placed between a headstock and tailstock on the engraver. The cylinders of the past were generally mounted on the engraver between a stationary headstock and a slidable tailstock. In shaftless cylinders, the headstock and tailstock each comprise a cone or mount received within an aperture in respective ends of the cylinder. The apertures in the cylinder varied in size depending on the printing press and related cylinder geometry. Consequently, the headstock and tailstock on the engraver had to be fitted with a particular cone or mount to fit into the mounting apertures of each cylinder. These mounting apertures varied in size such that the cone or mount on the headstock and tailstock had to be changed every time a new cylinder was mounted on the engraver.

U.S. Pat. No. 5,493,939, which is assigned to the same assignee as the present invention and which is incorporated herein by reference and made a part hereof, discloses a system and method for use on the headstock and tailstock of the engraver. The system and method involved used a universal cylinder mount which was adapted to receive various size mounting apertures and cylinders for easy mounting of various cylinders onto the engraver.

While the apparatus and method described in U.S. Pat. No. 5,493,939 made significant strides in permitting an engraver to accommodate cylinders of varying sizes or which had mounting apertures of various sizes, one problem that continued to be encountered was that sometimes the mounting surfaces defining the mounting apertures would "swell" when the mount was inserted therein. When the tailstock and/or headstock were moved away from each other, the cylinder would sometimes seize or become stuck on the universal cylinder mount. This problem was particularly encountered when the mounting aperture of the cylinder was made of a soft material, such as aluminum.

Therefore, there is a need for a method and apparatus which permits mounting a cylinder between a headstock and a tailstock of an engraver to reduce any seizing or sticking of the cylinder on the cylinder mount, while providing frictional engagement for rotating the cylinder to be engraved about its axis.

SUMMARY OF THE INVENTION

In one aspect, this invention comprises a universal cylinder mount for supporting an end of a cylinder mounted on an engraver comprising a support having a base end, a nose end and an axis of rotation, engagement means situated on the support for engaging a mounting aperture in the end of the cylinder to be engraved and wherein the engagement means is not parallel with the axis of rotation.

In another aspect, this invention comprises a universal cylinder support system for use on an engraver to mount one of a plurality of cylinders at an engraving station of the engraver having a headstock and a tailstock, each of the plurality of cylinders comprising a frustoconical mounting surface at each end thereof, the universal cylinder support system comprising a first support rotatably supported on the headstock, a second support rotatable supported on the tailstock and a frictional engagement surface located on each of the first and second supports for lockingly engaging the frustoconical mounting surfaces when the first and second supports are rotated in a first direction and unlocking when the first and second supports are moved away from the cylinder said frictional engagement surface defining an engagement angle which increases from a nose end of the first and second supports to a base end of the first and second supports.

In still another aspect, this invention comprises an engraver comprising a headstock, a tailstock for cooperating with the headstock to rotatably support one of a plurality of cylinders at an engraving station of an engraver, each of the plurality of cylinders comprises a first end and a second end, an engraving device for engraving one of the plurality of cylinders, a universal cylinder support system associated with at least one of the headstock or tailstock, the universal cylinder support system comprising a support having a base end, a nose end and an axis of rotation, an engagement surface situated on the base end for engaging a mounting aperture in the end of the cylinder to be engraved and wherein the engagement surface is not parallel with the axis of rotation and defines an engagement angle which decreases from said base end to said nose and.

In still another aspect, this invention comprises an engraver comprising a headstock, a tailstock for cooperating with the headstock to rotatably support one of a plurality of cylinders at an engraving station of an engraver, each of the plurality of cylinders comprises a first end and a second end, an engraving device for engraving one of the plurality of cylinders, a universal cylinder support system associated with at least one of the headstock or tailstock, the universal cylinder support system comprising a support having a base end, a nose end and an axis of rotation, an engagement surface situated on the base for engaging a mounting aperture in the end of the cylinder to be engraved and wherein the engagement surface is not parallel with the axis of rotation wherein the engagement surface comprises at least one land defining a conical helix, the shape of at least one land is defined by a helix having a plurality of land angles, each of the plurality of land angles being defined by the equation:

$$X=0.10Y^3-0.4405Y^2+3.154Y-0.8857,$$

where Y is a position on axis 36 and X is a position normal to an axis of the cylinder mount.

In yet another aspect, this invention comprises a method of supporting one of a plurality of cylinders at an engraving station of an engraver comprising a headstock and a tailstock, said method comprising the steps of providing at least one universal support comprising a support having a base end, a nose end, an axis of rotation and an engagement surface situated on the support for engaging a mounting aperture is the end of on of the plurality of cylinders to be engraved, wherein the engagement surface is not parallel with an axis of rotation of one of the plurality of cylinders and defines an engagement angle which increases from the nose end to the base end, situating at least one universal support for engraving and rotatably supporting an end of one of the plurality of cylinders on at least one of the headstock or the tailstock, at least one universal support comprising a support having a base end, a nose end, an axis of rotation and an engagement surface situated on the support for engaging a mounting aperture in the end of one of the plurality of cylinders to be engraved, wherein the engagement surface is not parallel with an axis of rotation of one of the plurality of cylinders, moving the at least one support into the mounting aperture and into engagement with the end of one of the plurality of cylinders driving at least one support in a first direction to secure the cylinder onto at least one support and moving at least one support out of the mounting aperture to dismount the cylinder from the cylinder from at least one support.

Other objects and advantages of the invention will be apparent from the following description, the accompanying drawings, and the appended claims.

BRIEF DESCRIPTION OF ACCOMPANYING DRAWINGS

FIG. 4A is a sectional view showing a concave-shaped cylinder mount;

FIG. 4B is a sectional view showing a convex-shaped cylinder mount;

FIG. 8 is a determined or unfolded view layout of the lands in accordance with an embodiment of the invention;

FIG. 9A is a sectional view illustrating a cylinder mount in accordance with one embodiment of the invention engaging a major diameter of a mounting surface in a sleeve of shaftless cylinder situated on an end of the engraver;

FIG. 9B is an enlarged fragmentary view of the circled area shown in FIG. 9A;

FIG. 10A is a sectional, fragmentary view showing a cylinder mount in accordance with one embodiment of this invention engaging a minor diameter of the mounting surface in the shaftless cylinder;

FIG. 10B is an enlarged view of the circled area shown in FIG. 10A;

FIG. 11A is a sectional fragmentary view of a cylinder mount in accordance with one embodiment of the invention showing the cylinder mount engaging the surface between the major and minor diameters; and FIG. 11B is an enlarged fragmentary view of the circled area shown in FIG. 11A.

DESCRIPTION OF THE PREFERRED EMBODIMENTS

Figure 1:
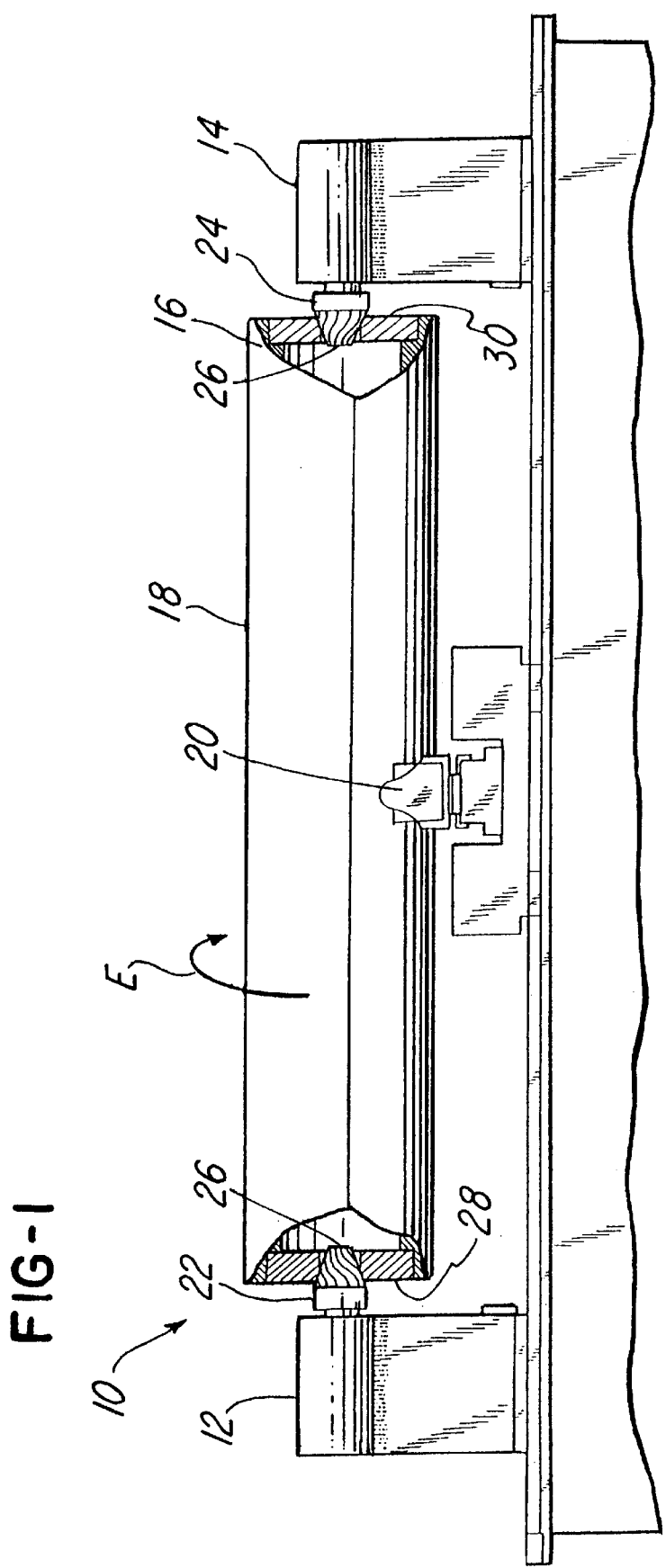
FIG. 1 is a partially cut away, elevational view showing a cylinder mounted on a gravure engraver incorporating the cylinder mount of the present invention.

Referring initially to FIG. 1, the universal cylinder mount of the present invention is shown in conjunction with a gravure engraver 10 having a headstock 12 and a tailstock 14. A plated cylinder 16 is shown mounted between the headstock 12 and the tailstock 14 at an engraving station 18 of the engraver 10. In addition, an electronically controlled engraving head 20 is located at the engraving station 18 for engraving the cylinder 16. Although the invention is described with reference to a gravure engraver, it should be understood that the universal cylinder mount of the present invention is adapted to be used for mounting cylinders in other applications, such as on laser engraving machines and/or polishing machines.

The headstock 12 and tailstock 14 each carry a universal cylinder mount 22 and 24, respectively, for frictional mating engagement within substantial identical mounting surfaces 26 defining mounting apertures 26a (FIGS. 9A–11B) defined in opposing ends 28 and 30 of the cylinder 16. In a typical cylinder mounting operation, the cylinder 16 is supported at the engraving station 18 by a temporary support (not shown) between the headstock 12 and tailstock 14. The tailstock 14 may be moved into engagement with the end 30 of the cylinder 16 causing the opposing end 28 to also move into engagement with the headstock 12 in the manner conventionally known. Alternatively, both the headstock 12 and the tailstock 14 may be mounted for simultaneously movement into engagement with the respective cylinder ends 28 and 30. In this regard, features of U.S. Pat. No. 5,424,846, which is assigned to the same assignee as the present invention and which is incorporated herein by reference and made apart hereof, may be utilized to control movement of the headstock 12 and the tailstock 14. Thus, it should be appreciated that engraver 10 is capable of accommodating cylinder 16 having varying lengths within the engraving station 18.

In addition, the cylinders 16 which are mounted at the engraving station 18 typically vary in diameter with resulting variations in the configuration and dimensions of the mounting surfaces 26. As a general proposition, larger cylinders 16 comprise larger mounting surfaces 26 and apertures 26a. Thus, for example, a 48 inch cylinder 16 may comprise a mounting aperture comprising a major diameter of about 4.5 inches (114.3 mm), while a 24 inch cylinder 16 may comprise a mounting aperture with a major diameter of about 2.75 inches (69.25 mm).

The features of the invention shown and described herein will be described with specific reference to cylinder mount 22, but it should be appreciated that the description is equally applicable to the opposing cylinder mount 24 and like parts have been identified with like numbers.

Figure 2:
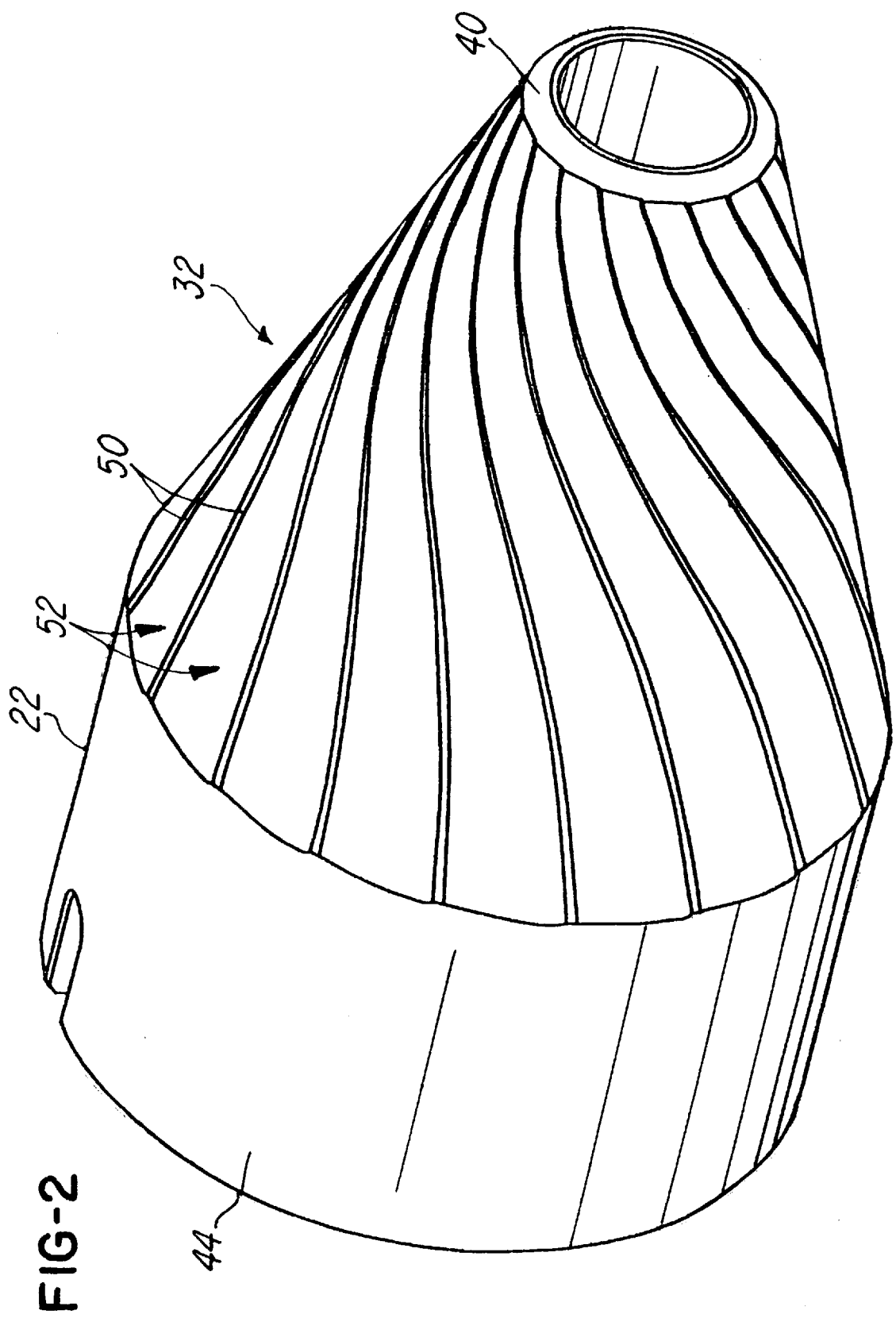
FIG. 2 is a perspective view of an embodiment of the cylinder mount of the present invention which is adapted to be mounted on a headstock of the engraver.
Figure 3:
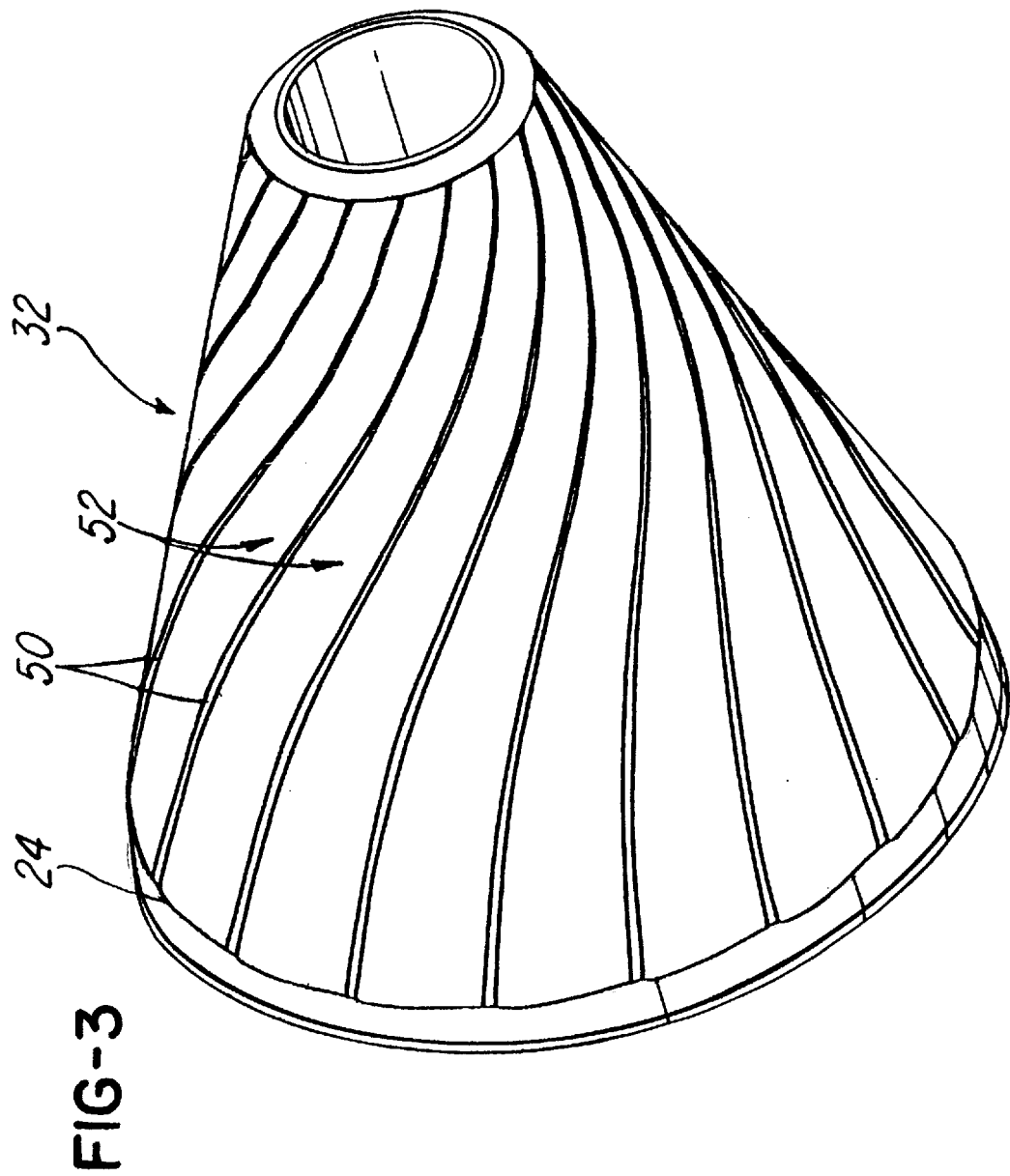
FIG. 3 is a perspective view of an embodiment of the cylinder mount of the present invention which is adapted to be mounted on a tailstock of the engraver.
Figure 4:
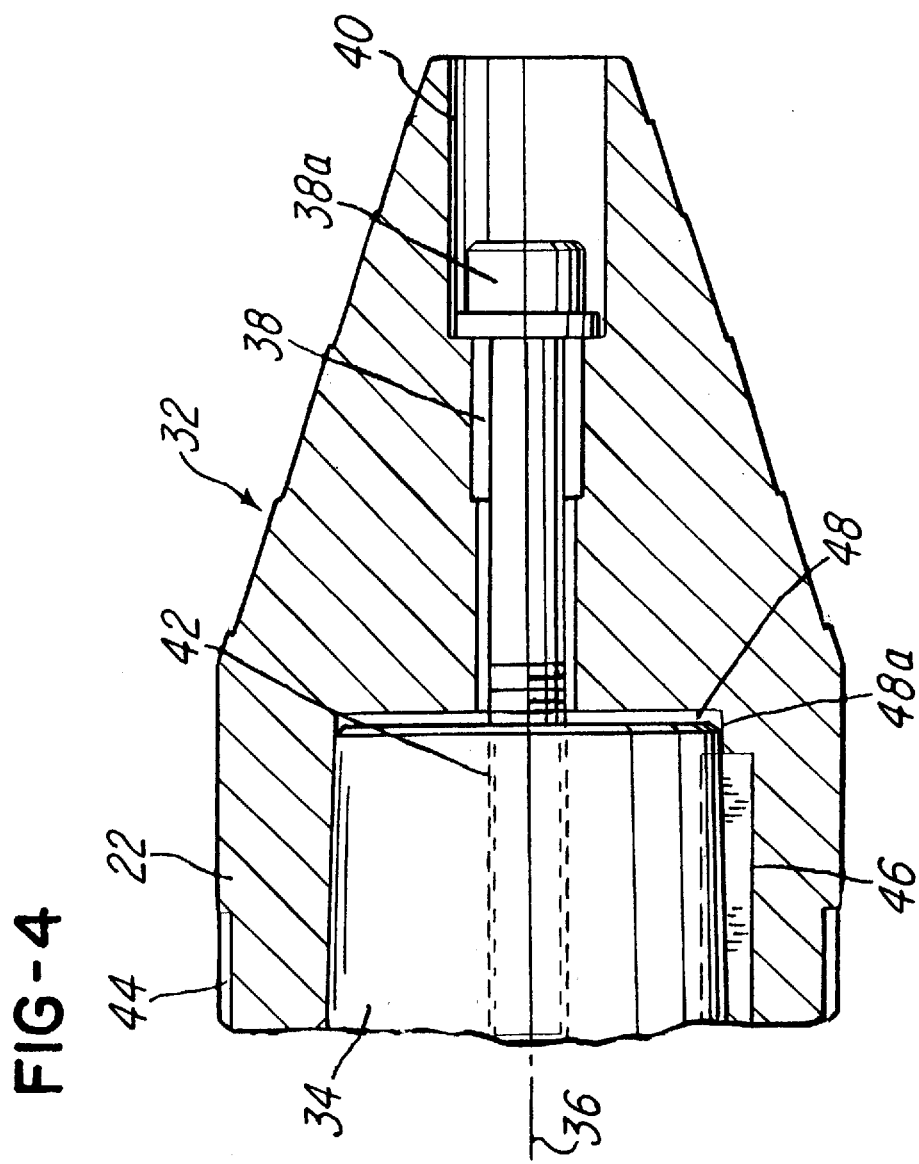
FIG. 4 is a sectional view of the cylinder mount shown in FIG. 2.

Referring to FIGS. 2 and 4, the universal cylinder mount 22 comprises a spindle assembly means or spindle 32 supported by a first shaft 34. It should be noted that the shaft 34 may comprise a drive shaft (not shown) coupled to a drive motor (not shown) associated with the headstock 12 for driving the cylinder mount 22 in rotational movement about a longitudinal axis 36 of the spindle 32. The spindle 32 may be attached to the base member or shaft 34 by any conventional means such as by a fastener 38 having a head portion 38a positioned co-axially to a nose end 40 of the spindle 32 and a threaded shank portion 42 threadably engaged with the shaft 34 adjacent to a base end 35 of the spindle 32. Further, the spindle assembly includes a key 46 which is engaged in a groove (not shown) formed on an inner surface 48a of an aperture 48 for receiving the shaft 34 and in a groove formed in the outer surface of the shaft 34, whereby relative rotation between the shaft 34 and the spindle 32 is prevented.

The cylinder mount 22 further comprises engagement means for defining engaging surfaces formed by a plurality of alternating lands 50 and grooves 52 (FIGS. 2, 3, 6 and 7). In the embodiment described, the lands 50 and grooves 52 define a conical helix, with each land 50 and groove 52 extending partially around the axis 36 from the nose end 40 to the base end 44, as shown. Further, the engagement surfaces formed by the lands 50 define a plurality of circumferences about the cylinder mount 22. The diameter of each circumference decreases in the direction from the base end 44 to the nose end 40. In the embodiment being described, the decrease in circumference is constant such that the cylinder mount 22 comprises a generally tapered shape as shown. It should be appreciated, however, that the decrease in circumference could be non-constant or non-linear such that an angle defined, for example, by the longitudinal axis 36 and the longitudinal tangent line, as defined by a line extending a direction from the base end 44 to the nose end 40 in tangent to the land surface 50, increases from the base end 44 to the nose end 40, as is taught by U.S. Pat. No. 5,493,939 which is incorporated herein by reference as shown in the cylinder mount 22' in FIG. 4A. FIG. 4B illustrates another embodiment showing a cylinder mount 22" which is convex in cross-section.

Each land 50 comprises a distinct land engaging edge or surface 60 (FIG. 7) which is separated by grooves 52 for positive frictional engagement between the spindle 32 and the surfaces 26 in the ends 28 and 30 of cylinder 16, whereby relative rotation between cylinder mount 22 and the cylinder 16 is prevented. Each engaging edge 60 comprises a cross-sectional shape defining an angle A which, in the embodiment being described, is greater than or equal to 90 degrees. In addition, the spiral or helical lands 50 provide an angled and "point" contact area for engaging the mounting surface 26 to prevent any seizing action between the cylinder mount 22 and the cylinder 16, while providing longitudinal movement of the cylinder mount 22 into and out of the apertures 26a when the cylinder 16 is dismounted.

Further, tapered configuration of the lands 50 permit the spindle 32 to accommodate frusto-conically-shaped mounting apertures 26 which have different diameters as well as different slopes or angles of inclination for the surfaces 26. As illustrated in FIG. 9A, for example, the mounting surface 26 lies generally between a major diameter 55 and a minor diameter 57. The progressive tapered spindle 32 is particularly adapted to accommodate the varying angles of inclination for the mounting surface 26 defining the aperture 26a, as may be seen in comparison in FIGS. 9A–11B. Thus, notice in FIGS. 9A–9B that the lands 50 engage the major diameter 55, while in FIGS. 10A–10B the lands 50 engage the minor diameter 57. For medium-sized cylinders 16, the lands 50 may engage a center portion 61 of mounting surface 26 lying between the major and minor diameters 55 and 57, as best shown in FIGS. 11A–11B.

As illustrated in FIGS. 9A–11B, it is preferable to engage the major diameter 55 or minor diameter 57, for example, of the mounting surface 26, rather than the entire surface 26, to facilitate reducing or eliminating any seizing action that may occur between cylinder 16 and spindle 23. Alternatively, the spindle 32 could be shaped such that it complements the frusto-conical shape of the mounting surface 26 to further facilitate quick release and the reduction of any seizing action that may occur.

FIG. 8 shows a developed or unfolded view of the pattern of lands 50 and grooves 52 as they are laid out on spindle 32. Notice that each land 50 defines a path which is substantially spiral or helical and which extends about the axis 36 less than 360° and in this embodiment, less than 180°. It should be appreciated, however, that the lands may extend about axis 36 more than 360°. Thus, each land 50 has an engaging edge 60 (FIG. 7) which extends continuously between the base end 44 and nose end 40, but they may be formed to be intermittent or discontinuous (not shown) if desired.

As best illustrated in FIG. 8, each land 50 comprises a plurality of helix or lead angles, such as lead angles B, C and D, respectively, defined by the insertion of tangent lines B1, C1 and D1 and axis 36 of spindle 32. In the embodiment being described, the lead angles B, C and D increase from the nose end 40 to the base end 44. In the embodiment being described, the substantially spiral or helix shape of each land 50 is defined by the following equation 1:

$$X = 0.10Y^3 - 0.4405Y^2 + 3.154Y - 0.8857,$$

where Y is a position on axis 36 and X is a position normal to axis 36 and represents an arc length in the unfolded or developed view as illustrated in FIG. 8.

It has been found that providing at least one land 50 having the helical shape illustrated facilitates reducing seizing and accommodating different diameter mounting surfaces 26 in that the cylinder mount 22 may make "point" contact with the major diameter 55, minor diameter 57 or surface portion 59, as illustrated in FIGS. 9A–11B. Also, the spiral or helical shape of the lands 50 tends to engage and grip or fictionally engage mounting surface 26 when the cylinder mounts 22 and 24 are rotated in an engraving direction, such as direction of arrow E in FIG. 1. It has also been found that, as the mounts 22 and 24 are moved out of their mounting apertures 26a, the plurality of lands 50 release such that the cylinder mount 22 does not seize against the mounting surface 26.

In general, as cylinders 16 become larger in axial length and circumference, their mass increases. The increase in the land angles B, C and D provides increased gripping or frictional engagement as major diameter and cylinder mass increase proportionally.

Figure 5:
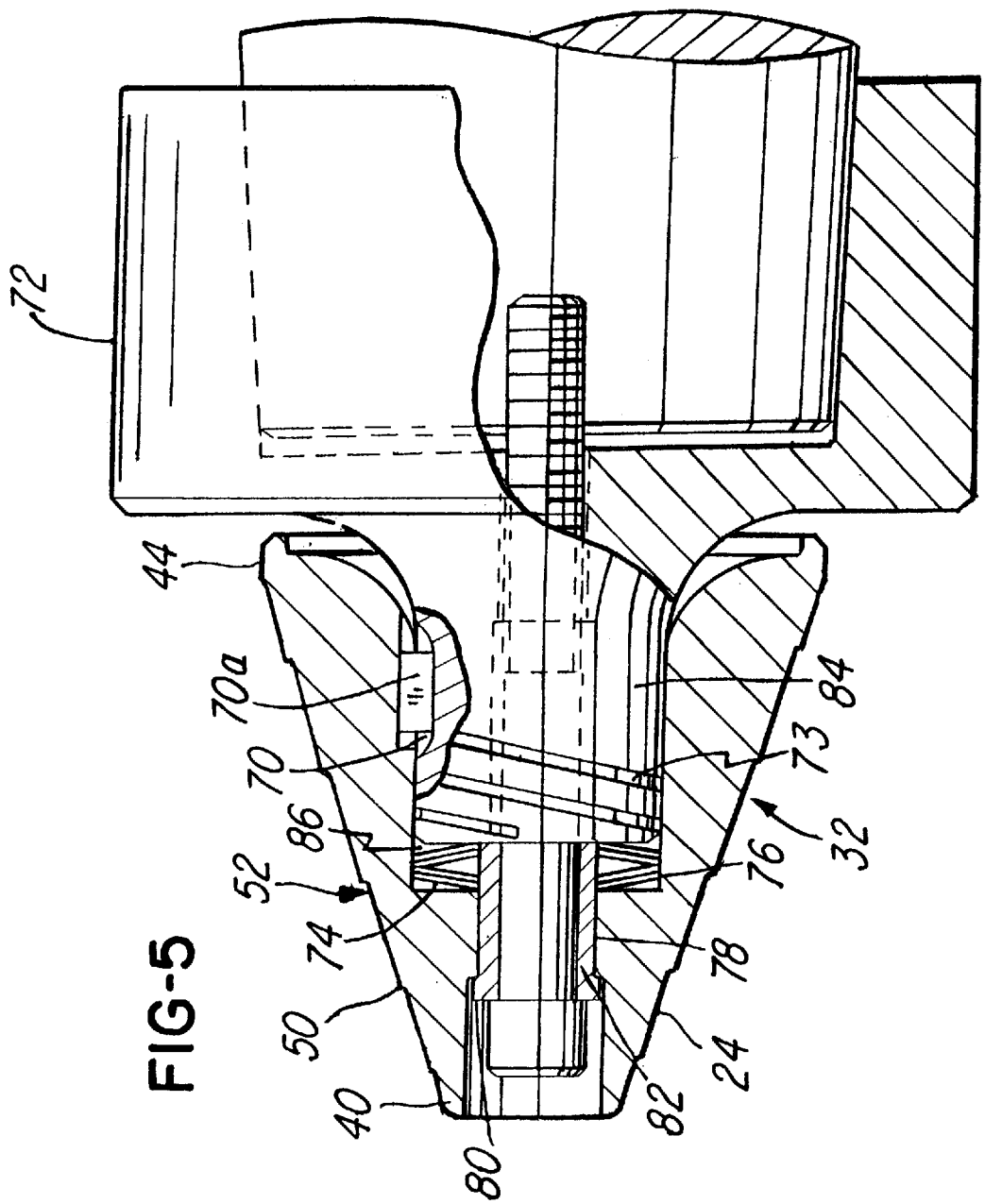
FIG. 5 is a sectional view of the cylinder mount shown in FIG. 3.
Figure 7:
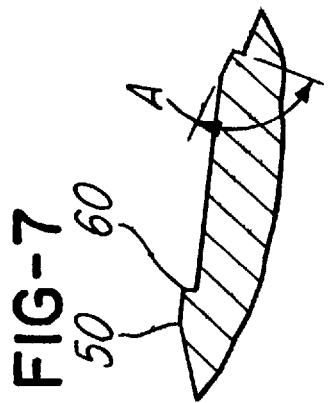
FIG. 7 is an enlarged fragmentary view of the lands and grooves shown in FIG. 6.
Figure 6:
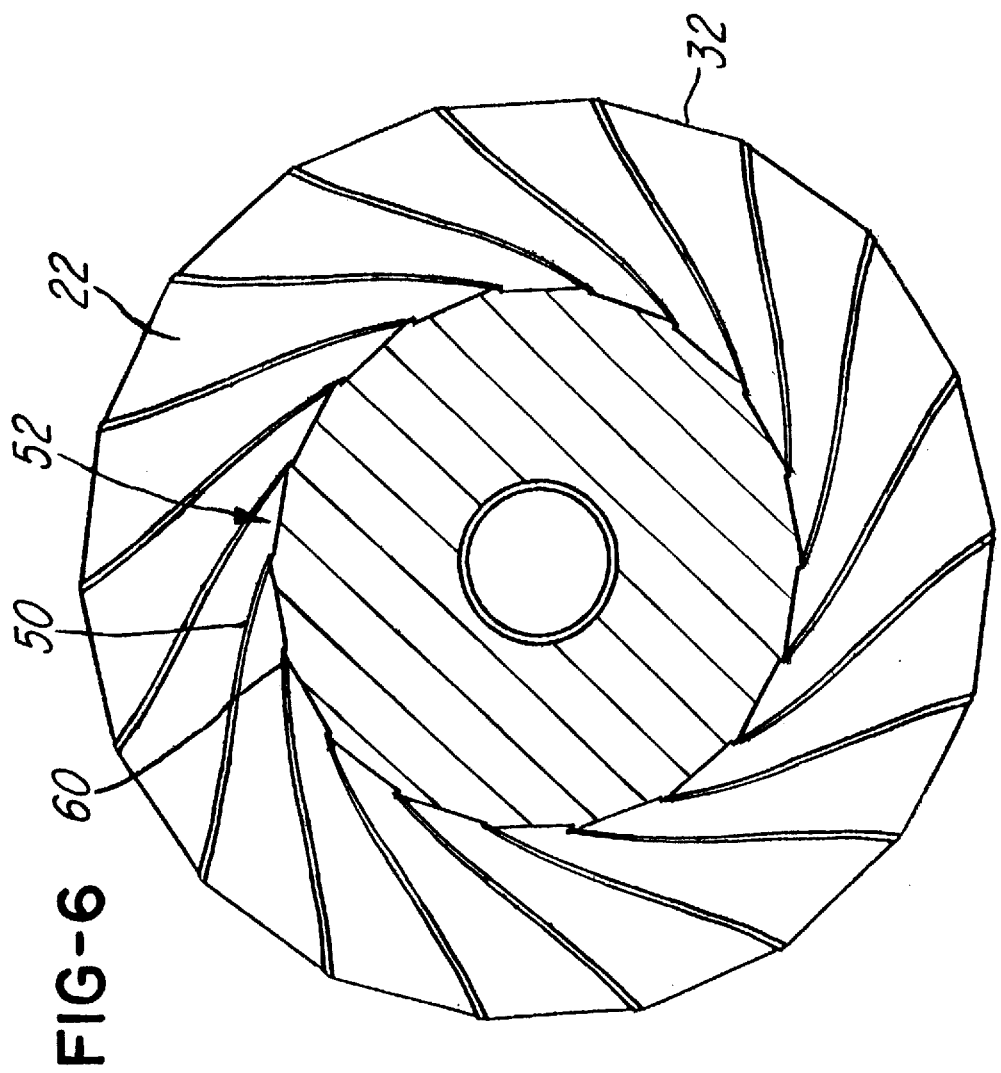
FIG. 6 is a sectional view of the cylinder mount shown in FIG. 2 illustrating various details of the lands and grooves.

The cylinder mount 24 (FIG. 5) is also preferably provided with a key 70a in a base member 72 which cooperates with key slot or keyway 70 in cylinder mount 24. The key 70a prevents relative rotational movement between the cylinder mount 24 and the base member 72. Further, the base member 72 includes an aperture 74 which receives a resilient biasing element 76 which acts as a spring to bias the cylinder mount 24 outwardly away from the base member 72 to a position where a flange 78 engages against a head portion 80 of a spacer 82. The biasing elements 76 are preferably composite urethane springs which provide a predetermined force against spindle 32, whereby the force applied by the spindle 32 against the end of a cylinder 16 may be controlled.

It should also be noted that the shank 84 of the base member 72 is provided with a spiral lubricating channel 73 containing a lubricant (not shown) to lubricate the contact surfaces between the shank 84 and the central aperture wall 86 of the spindle 32. In this manner, the longitudinal movement of the spindle 32 relative to base member 72 is lubricated.

When the cylinder 16 is supported between mounts 22 and 24, the biasing element 76 acts so that a predetermined force is supplied against the cylinder 16 to provide a uniform clamping pressure for supporting the cylinder 16 at the engraving station 18. It should also be apparent that the universal cylinder mount 24 acts to positively bias the cylinder 16 towards the headstock 12, thereby enabling the headstock 12 to drive the cylinder 16. The cylinder mount 24 further promotes positive cylinder engagement and registration at the engraving station 18 during any small relative lateral movement of the headstock 12 or tailstock 14. It should also be apparent that the cylinder mounts 22 and 24 act to positively bias the cylinder 16 to promote positive cylinder 16 positioning engagement during any small relative lateral movement of the headstock 12 or tailstock 14.

A method of supporting one of the plurality of cylinders 16 at the engraving station 18 of the engraver 10 will now be described. First, the universal cylinder mounts 22 and 24 comprise at least one land 50 of the shape and form described earlier herein are situated on one or both the headstock 12 or tailstock 14. Notice that each of the lands 50 rotate about axis 36 of the spindle 32, but they are generally not parallel with an axis 36 of rotation because of their conical shape.

At this point, a controller (not shown) coupled to suitable drivers (not shown) may cause, for example, tailstock 14 to be moved into mounting aperture 26a of cylinder 16 until the lands 50 on cylinder mounts 22 and 24 engage their respect mounting surfaces 26 on the cylinder ends 28 and 30. Thereafter, a controller energizes a drive motor (not shown) to rotatably drive cylinder mount 22 so that cylinder 16 is rotated in the engraving direction (identified by arrow E in FIG. 1). It has been found that the start up inertia and movement of the mounts 22 and 24 relative to the mounting surfaces 26 facilitates causing the lands 50 to "grip" the mounting surfaces 26.

After an engraving operation is performed, the rotation of cylinder 16 is stopped. At this point, the tailstock 14, for example, may be driven away from headstock 12 such that the cylinder 16 is released and may be dismounted and subsequently placed in a printing press (not shown) for printing.

In addition, it should also be noted that the present invention is described with the universal cylinder mount 22 located at the headstock 12 and the resiliently biased universal cylinder mount 24 located at the tailstock 14. However, resiliently biased cylinder mounts similar to the cylinder mount 24 may be provided on both headstock 12 and the tailstock 14 to provide a desired mounting force against the cylinder ends 28 and 30. Conversely, both the headstock 12 and the tailstock 14 could have a fixed non-resilient mount, like mount 22.

While the method herein described, and the form of apparatus for carrying this method into effect, constitute preferred embodiments of this invention, it is to be understood that the invention is not limited to this precise method and form of apparatus. Thus, changes may be made in either without departing from the scope of the invention, which is defined in the appended claims.

What is claimed is:

1. A universal cylinder mount for mounting on an engraver for supporting an end of a cylinder mounted on the engraver, comprising:
   a support rotatably mounted on the engraver, said support having a base end, a nose end and an axis of rotation;
   engagement means situated on said support for engaging a mounting aperture in said end of said cylinder to be engraved; and
   wherein said engagement means defines an engagement angle which gradually increases from said nose end to said base end about said axis of rotation.

2. The universal cylinder mount as recited in claim 1, wherein said support comprises a circumference which decreases in a direction from said base end to said nose end.

3. The universal cylinder mount as recited in claim 1, wherein the engagement means comprises at least one land situated between said base end and said nose end.

4. The universal cylinder mount as recited in claim 1, wherein said engagement means comprises at least one land situated between said base end and said nose end, said at least one land defining a path which is helical.

5. The universal cylinder mount as recited in claim 1, wherein said engagement means comprises a plurality of lands situated between said base end and said nose end.

6. The universal cylinder mount as recited in claim 2, wherein said engagement means comprises at least one land situated between said base end and said nose end, said at least one land defining a path which is helical.

7. The universal cylinder mount as recited in claim 5, wherein said engagement means comprises a plurality of lands situated between said base end and said nose end, said at least one of said plurality of lands defining a path which is helical.

8. The universal cylinder mount as recited in claim 5, wherein each if said plurality of lands defines a path which is helical.

9. The universal cylinder mount as recited in claim 1, wherein said engagement means defines a conical helix.

10. The universal cylinder mount as recited in claim 1, wherein said engagement means comprises at least one land defining a conical helix.

11. The universal cylinder mount as recited in claim 3, wherein said at least one land extends continuously between said base end and said nose end.

12. The universal cylinder mount as recited in claim 1, where said engagement means lockingly engages said end of said cylinder when said support is rotatably driven in a first direction and unlocks when said cylinder mount is moved away from said cylinder.

13. The universal cylinder mount as recited in claim 1, wherein support is tapered from said base end to said nose end.

14. The universal cylinder mount as recited in claim 1, wherein said support is convex from said base end to said nose end.

15. The universal cylinder mount as recited in claim 10, wherein said conical helix comprises a plurality of angles which increase from said nose end to said base end.

16. The universal cylinder mount as recited in claim 10, wherein said conical helix comprises a plurality of angles, said plurality of land angles increasing from said nose end to said base end.

17. The universal cylinder mount as recited in claim 10, wherein said at least one land comprises an engaging edge comprising a cross-sectional shape defining an engaging angle greater than or equal to 90 degrees.

18. The universal cylinder mount as recited in claim 17, wherein said engaging angle is acute.

19. The universal cylinder mount as recited in claim 16 wherein each of said plurality of lead angles comprises an associated land comprising an engaging edge of cross-sectional shape defining an engaging angle of greater than or equal to 90°.

20. A universal cylinder mount for supporting an end of a cylinder mounted on an engraver comprising; a support having a base end, a nose end and an axis of rotation;
engagement means situated on said base for engaging a mounting aperture in said end of said cylinder to be engraved; and
wherein said engagement means is not parallel with said axis of rotation;
wherein the engagement means comprises at least one land situated between said base end and said nose end;
wherein the shape of said at least one land is defined by a helix having a plurality of land angles, each of said plurality of land angles being defined by the equation:

$$X = 0.10Y^3 - 0.4405Y^2 + 3.154Y - 0.8857,$$

where Y is a position on an axis and X is a position normal to an axis of the cylinder mount.

21. A universal cylinder support system for use on an engraver to mount one of a plurality of cylinders at an engraving station of said engraver having a headstock and a tailstock, each of said plurality of cylinders comprising a frustoconical mounting surface at each end thereof; said universal cylinder support system comprising:
a first support rotatably supported on said headstock of said engraver;
a second support rotatable supported on said tailstock of said engraver; and
a frictional engagement surface located on each of said first and second supports for lockingly engaging said frustoconical mounting surfaces when said first and second supports are rotated in a first direction and unlocking when said first and second supports are moved away from said cylinder; said frictional engagement surface defining an engagement angle which increases from a nose end of said first and second supports to a base end of said first and second supports.

22. The universal cylinder support system as recited in claim 21, wherein each of said first and second said supports having a base end, a nose end and an axis of rotation, said frictional engagement surface being non-parallel with said axis of rotation.

23. The universal cylinder support system as recited in claim 21, wherein each of said first and second supports comprises a base end, a nose end and a circumference which decreases in a direction from said base end to said nose end.

24. The universal cylinder support system as recited in claim 21, wherein each of said frictional engagement surfaces comprising at least one land situated between said base end and said nose end.

25. The universal cylinder support system as recited in claim 21, wherein said frictional engagement surface comprises at least one land situated between said base end and said nose end, said at least one land defining a path which is helical.

26. The universal cylinder support system as recited in claim 21 wherein said frictional engagement surface comprises a plurality of lands situated between said base end and said nose end.

27. The universal cylinder support system as recited in claim 21, wherein said frictional engagement surface comprising a plurality of lands situated between said base end and said nose end said at least one of said plurality of lands defining a path which is helical.

28. The universal cylinder support system as recited in claim 27, wherein each of said plurality of lands defines a path which is helical.

29. The universal cylinder support system as recited in claim 21, wherein said frictional engagement surface defining a conical helix.

30. The universal cylinder support system as recited in claim 21, wherein said frictional engagement surface comprising at least one land defining a conical helix.

31. The universal cylinder support system as recited in claim 24, wherein said at least one land extends continuously between said base end and said nose end.

32. The universal cylinder support system as recited in claim 21, wherein said frictional engagement surface lockingly engages said end of said cylinder when said support is rotatably driven in a first direction and unlockingly when said support is moved away from said cylinder.

33. The universal cylinder support system as recited in claim 21, wherein each of said first and second supports is tapered from said base end to said nose end.

34. The universal cylinder support system as recited in claim 21 wherein each of said first and second supports is concave from said base end to said nose end.

35. The universal cylinder support system as recited in claim 30, wherein said conical helix comprises a plurality of angles which increase from said nose end to said base end.

36. The universal cylinder support system as recited in claim 30, wherein said conical helix comprises a plurality of lead angles, said plurality of lead angles increasing from said nose end to said base end.

37. The universal cylinder support system as recited in claim 30, wherein said at least one land comprising an engaging edge comprising a cross-sectional shape defining an engaging angle greater than or equal to 90 degrees.

38. A universal cylinder support system for use on an engraver to mount one of a plurality of cylinders at en engraving station of said engraver having a headstock and a tailstock, each of said plurality of cylinders comprising a frustoconical mounting surface at each end thereof; said universal cylinder support system comprising:
a first support rotatably supported on said headstock;
a second support rotatable supported on said tailstock;
a frictional engagement surface located on each of said first and second supports for lockingly engaging said frustoconical mounting surfaces when said first and second supports are rotated in a first direction and unlocking when said first and second supports are moved away from said cylinder;
wherein each of said frictional engagement surfaces comprising at least one land situated between said base end and said nose end; and
wherein the shape of said at least one land is defined by a helix having a plurality of land angles, each of said plurality of land angles being defined by the equation:

$$X = 0.10Y^3 - 0.4405Y^2 + 3.154Y - 0.8857,$$

where Y is a position on axis 36 and X is a position normal to an axis of the cylinder mount.

39. An engraver comprising:

a headstock;

a tailstock for cooperating with said headstock to rotatably support one of a plurality of cylinders at an engraving station of an engraver, each of said plurality of cylinders comprises a first end and a second end;

an engraving device for engraving said one of said plurality of cylinders;

an universal cylinder support system associated with at least one of said headstock or tailstock, said universal cylinder support system comprising:

a support having a base end, a nose end and an axis of rotation;

an engagement surface situated on said base end for engaging a mounting aperture in said end of said cylinder to be engraved; and wherein said engagement surface is not parallel with said axis of rotation and defines an engagement angle which decreases from said base end to said nose end.

40. The engraver as recited in claim 39, wherein said support comprises a circumference which decreases in a direction from said base end to said nose end.

41. The engraver as recited in claim 39, wherein the engagement surface comprises at least one land situated between said base end and said nose end.

42. The engraver as recited in claim 39, wherein said engagement surface comprises at least one land situated between said base end and said nose end, said at least one land defining a path which is helical.

43. The engraver as recited in claim 39, wherein said engagement surface comprises a plurality of lands situated between said base end and said nose end.

44. The engraver as recited in claim 39, wherein said engagement surface comprises a plurality of lands situated between said base end and said nose end, said at least one of said plurality of lands defining a path which is helical.

45. The engraver as recited in claim 44, wherein each if said plurality of lands defines a path which is helical.

46. The engraver as recited in claim 39, wherein said engagement surface defines a conical helix.

47. The engraver as recited in claim 46, wherein an angle of engagement of said conical helix increases from said nose end to said base end.

48. The engraver as recited in claim 39, wherein said engagement surface comprises at least one land defining a conical helix.

49. The engraver as recited in claim 48, wherein said at least one land extends continuously between said base end and said nose end.

50. The engraver as recited in claim 48 wherein said conical helix comprises a plurality of angles which increase from said nose end to said base end.

51. The engraver as recited in claim 48, wherein said conical helix comprises a plurality of angles, said plurality of land angles increasing from said nose end to said base end.

52. The engraver as recited in claim 48, wherein said at least one land comprises an engaging edge comprising a cross-sectional shape defining an engaging angle greater than or equal to 90 degrees.

53. The engraver as recited in claim 52, wherein said engaging angle is acute.

54. The engraver as recited in claim 39 wherein said support is convex from said base end to said nose end.

55. The engraver as recited in claim 39, wherein said engagement surface lockingly engages said end of said cylinder when said support is rotatably driven in a first direction and unlocking when said support is moved away from said cylinder.

56. The engraver as recited in claim 39, wherein said support is tapered from said base end to said nose end.

57. An engraver comprising:

a headstock;

a tailstock for cooperating with said headstock to rotatably support one of a plurality of cylinders at an engraving station of an engraver, each of said plurality of cylinders comprises a first end and a second end;

an engraving device for engraving said one of said plurality of cylinders;

an universal cylinder support system associated with at least one of said headstock or tailstock, said universal cylinder support system comprising:

a support having a base end, a nose end and an axis of rotation;

an engagement surface situated on said base for engaging a mounting aperture in said end of said cylinder to be engraved; and wherein said engagement surface is not parallel with said axis of rotation;

wherein said engagement surface comprises at least one land defining a conical helix;

the shape of said at least one land is defined by a helix having a plurality of land angles, each of said plurality of land angles being defined by the equation:

$$X=0.10Y^3-0.4405Y^2+3.154Y-0.8857,$$

where Y is a position on axis 36 and X is a position normal to an axis of the cylinder mount.

58. A method of supporting one of a plurality of cylinders at an engraving station of an engraver comprising a headstock and a tailstock, said method comprising the steps of:

providing at least one universal support comprising a support having a base end, a nose end, an axis of rotation and an engagement surface situated on said support for engaging a mounting aperture in said end of said one of said plurality of cylinders to be engraved, wherein said engagement surface is not parallel with an axis of rotation of said one of said plurality of cylinders and defines an engagement angle which increases from said nose end to said base end;

situating said at least one universal support on at least one of said headstock or said tailstock;

moving said at least one universal support into said mounting aperture and into engagement with said end of said one of said plurality of cylinders;

driving said at least one universal support in a first direction to secure said cylinder onto said at least one support; and moving said at least one universal support out of said mounting aperture to dismount said cylinder from said cylinder from said at least one universal support.

59. The method as recited in claim 58, wherein said method further comprises the step of:

defining said engagement surface to comprise at least one land situated between said base end and said nose end.

60. The method as recited in claim 58, wherein said method further comprises the step of:

defining said engagement surface to comprise at least one land situated between said base end and said nose end, said at least one land defining a path which is helical.

61. The method as recited in claim 58, wherein said method further comprises the step of:

defining said engagement surface to comprise a plurality of lands situated between said base end and said nose end.

62. The method as recited in claim 59, wherein said method further comprises the step of:

defining said engagement surface to comprise at least one land situated between said base end and said nose end, said at least one land defining a path which is helical.

63. The method as recited in claim 62, wherein said at least one land defines a conical helix.

64. The method as recited in claim 62, wherein said at least one land comprises a plurality of angles of engagement which increases from said nose end to said base end.

65. The method as recited in claim 62, wherein said at least one land extends continuously between said base end and said nose end.

66. The method as recited in claim 62, wherein said method further comprises the step of:

providing said at least one universal support defining at least one land comprising an engaging edge comprising a cross-sectional shape defining a plurality of engaging angles which increase from said nose end to said base end.

67. The method as recited in claim 66, wherein said engaging angle is acute.

68. The method as recited in claim 61, wherein said method further comprises the step of:

defining said engagement surface to comprise a plurality of lands situated between said base end and said nose end, said at least one of said plurality of lands defining path which is helical.

69. The method is recited in claim 68, wherein each of said plurality of lands defines a path which is helical.

70. The method as recited in claim 58, where in said at least one universal support is tapered from said base end to said nose end.

71. The method as recited in claim 58, wherein said at least one universal support is concave from said base end to said nose end.

72. The method as recited in claim 58, wherein said method further comprising the step of:

defining a conical helix comprising a plurality of leads which increases from said nose end to said base end.

73. The method as recited in claim 58, wherein said method further comprises the step of:

defining a conical helix comprising a plurality of lands comprising an associated plurality of land angles which increase from said nose end to said base end.

74. A method of supporting one of a plurality of cylinders at an engraving station of an engraver comprising a headstock and a tailstock, said method comprising the steps of:

situating at least one universal support for engraving and rotatably supporting an end of said one of said plurality of cylinders on at least one of said headstock or said tailstock, said at least one universal support comprising a support having a base end, a nose end, an axis of rotation and an engagement surface situated on said support for engaging a mounting aperture in said end of said one of said plurality of cylinders to be engraved, wherein said engagement surface is not parallel with an axis of rotation of said one of said plurality of cylinders;

moving said at least one universal support into said mounting aperture and into engagement with said end of said one of said plurality of cylinders;

driving said at least one universal support in a first direction to secure said cylinder onto said at least one support; and moving said at least one universal support out of said mounting aperture to dismount said cylinder from said at least one universal support;

wherein said method further comprises the step of:

defining said engagement surface to comprise at least one land situated between said base end and said nose end;

wherein said method further comprises the step of:

defining said engagement surface to comprise at least one land situated between said base end and said nose end, said at least one land defining a path which is helical; and wherein said at least one land comprises a shape defined by a helix having a plurality of land angles, each of said plurality of land angles being defined by the equation:

$$X = 0.10Y^3 - 0.4405Y^2 + 3.154Y - 0.8857,$$

where Y is a position on axis 36 and X is a position normal to an axis of the cylinder mount.

* * * * *